United States Patent [19]

Schoolman

[11] Patent Number: 5,282,352
[45] Date of Patent: Feb. 1, 1994

[54] CORN HEAD ASSEMBLY

[76] Inventor: Ronald E. Schoolman, R.R. #2, Box 43, Onarga, Ill. 60955

[21] Appl. No.: 983,703

[22] Filed: Dec. 1, 1992

[51] Int. Cl.$^5$ .......................................... A01D 45/00
[52] U.S. Cl. ...................................................... 56/62
[58] Field of Search ............... 56/17.2, 13.9, 62, 14.3, 56/14.5, 13.8, 51, 53

[56] References Cited

U.S. PATENT DOCUMENTS 3,925,969 12/1975 Shunichi ............................ 56/62 X
4,512,142 4/1985 Landry et al. ..................... 56/13.9
4,999,983 3/1991 Britt et al. ........................... 56/62 X Primary Examiner—Thuy M. Bui
Attorney, Agent, or Firm—Roger M. Fitz-Gerald

[57] ABSTRACT

A corn head with a pair of parallel counterrotating harvesting rolls is disclosed. Each roll has primary flutes and secondary flutes extending longitudinally which oppose flutes of the other type on the other roll. Improved ear stripping and stalk processing by crushing result.

6 Claims, 3 Drawing Sheets

CORN HEAD ASSEMBLY

SUMMARY OF INVENTION

A corn head is provided with snapping rolls having primary and secondary flutes which deliver improved stripping of ears from stalks with less residue and improved processing of stalks by crushing.

BACKGROUND OF THE INVENTION

This invention relates to improvements in machines for harvesting corn. Mechanical harvesting of corn has taken place for decades. However, efforts continue to improve corn harvesters to make them more efficient and effective because of the unpredictable and usually narrow profit margins involved in farming. As farms have increased in size while the farm work force has diminished, capital investment in equipment has increased in comparison to investment in land and to labor expenses, including returns on the labor of operating individual farmers. Thus there is always a need to further improve the operation and results of the equipment.

A corn harvester generally includes a corn head or front head which removes the ears from the stalks and a separator or thresher which separates the grains of corn from all other materials such as cobs, small pieces of corn husks, tassels, leaves, ear stalks, and broken off pieces of main stalks. Such materials, referred to as trash, are reduced to small pieces and spread more or less uniformly on the field as part of the harvesting operation. It is desirable to reduce the amount of trash to reduce clogging of the aperture slot or various processing mechanisms in the separator.

A corn head in the most modern form includes several corn head assemblies, one for each row which is being harvested in a single pass over the field. As the harvester moves forward the corn plants in each row enter forwardly extending channels leading to the corn head. Generally the corn head includes a stripper plate or snapper plate inclined toward the ground at an angle of about 45°. The plate is provided with a fore and aft extending slot or aperture which is wide enough to receive the lower end of the corn stalk but not wide enough for the stalk and an ear of corn to pass through. As the plate moves forward it exerts a forward and upward force on the ear.

Below the snapping plate in each corn head unit are a pair of snapping rolls the axes of which are inclined toward the ground parallel to the snapper plate aperture and on each side thereof. The rolls rotate in opposite directions to one another engaging the stalk below the snapper plate. The directions of rotation are such as to exert a downward and rearward force on the stalk relative to the snapper plate. The generally opposing forces exerted by the rolls and plate on the stalk and ear snaps off the ear from the stalk. The ears and any trash which do not pass through the aperture are transported to the separator. The stalk generally remains rooted in the ground.

Snapper rolls generally have conical front ends to provide a space for entry of the base of the stalk and cylindrical rear ends which engage the stalk. The front end and the forward portion of the rear end may be provided with helical ridges wound in opposite senses on each roller in a pair to drive the stalk rearwardly relative to the snapper plate. The rear ends of snapper rolls have been provided with circumferentially spaced, axially extending and radially projecting flutes which also engage the stalk. The rolls in each head are registered with one another so that the flutes intermesh in the manner of gears. One version is shown in U.S. Pat. No. 4,233,804.

In the Fischer patent there are snapper rolls which draw the stalk through a stripper plate as previously described. These rolls have conical front ends and cylindrical rear ends. The portions of the rear ends adjacent the front ends are provided with opposite sense helical ridges. The other portions of the bodies are provided with axially extending flutes. In this patent alternate flutes project radially and non-radially from the bodies and cooperate with the other type of flute on the other roll and thereby bend the stalk. All the flutes are tapered from a smaller projection measured radially near the front head to a larger radial projection remote from the head.

In conventional farming the soil is tilled after the crop is harvested in the fall in order to break up the roots and stalks left in the field and again before planting of the next crop to provide loose soil to receive the seed. Low till techniques seek to minimize the number of tillings in order to save on fuel costs for machinery, extend the life of machines or enable larger acreage to be tilled, and save on labor costs or enable the same or larger acreage to be handled by the same or a smaller work force. No till farming takes the ultimate step of eliminating all tillage. Nature is relied upon to decompose the roots and stalks sufficiently to permit planting and growth of the next crop.

Less tillage minimizes soil erosion and pollution of water in wells, aquifers and waterways and minimizes the runoff of plant nutrients, unused commercial fertilizers, and herbicide residues. Less tillage and no till techniques, in particular, are believed to improve moisture retention in the soil aiding future crops because the residue left on the ground with these techniques acts as a mulch. The composting effect of the residue after it has decomposed may in the long-term reduce the need for commercial fertilizer. Low till and no till techniques are encouraged or required on some farmland by laws and regulations concerning pollution and erosion.

Regardless of the techniques used it is desirable for the stalks of corn to be left in the field in a condition which will facilitate rapid decomposition. The need is greatest of course when no till techniques are used.

This invention provides improved snapping action resulting in a cleaner break of the ear from the stalk and less trash running through the separator and also better prepares the stalks for decomposition.

DETAILED DESCRIPTION

Figure 1:
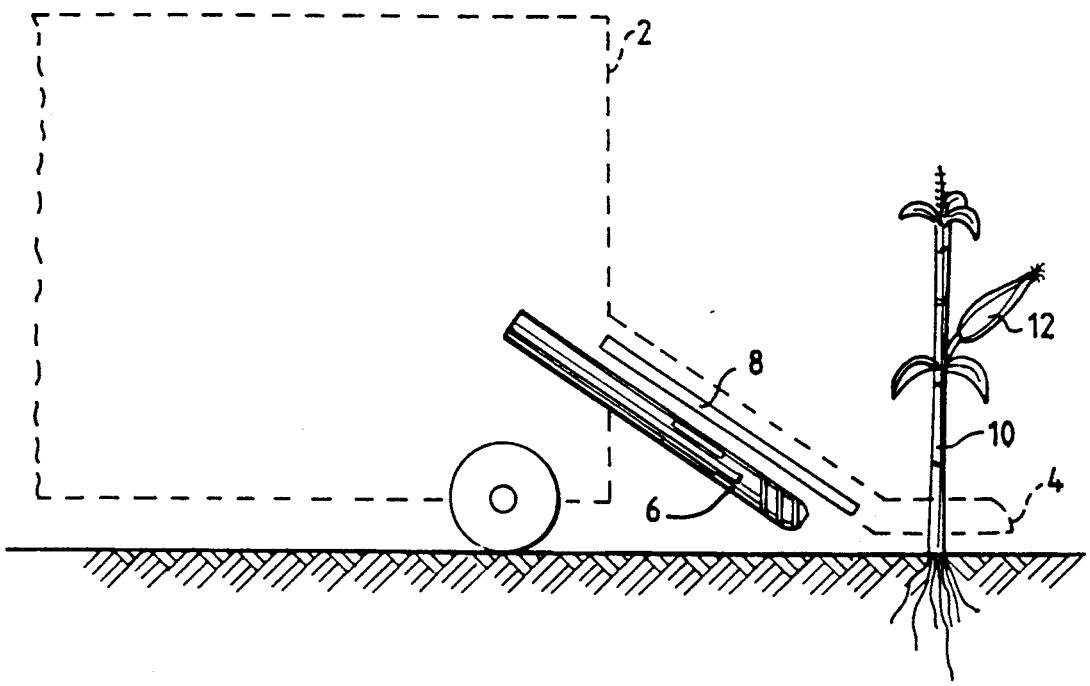
FIG. 1 is a schematic side view of a corn head assembly with a portion of the rest of the harvester shown in phantom.
Figure 2:
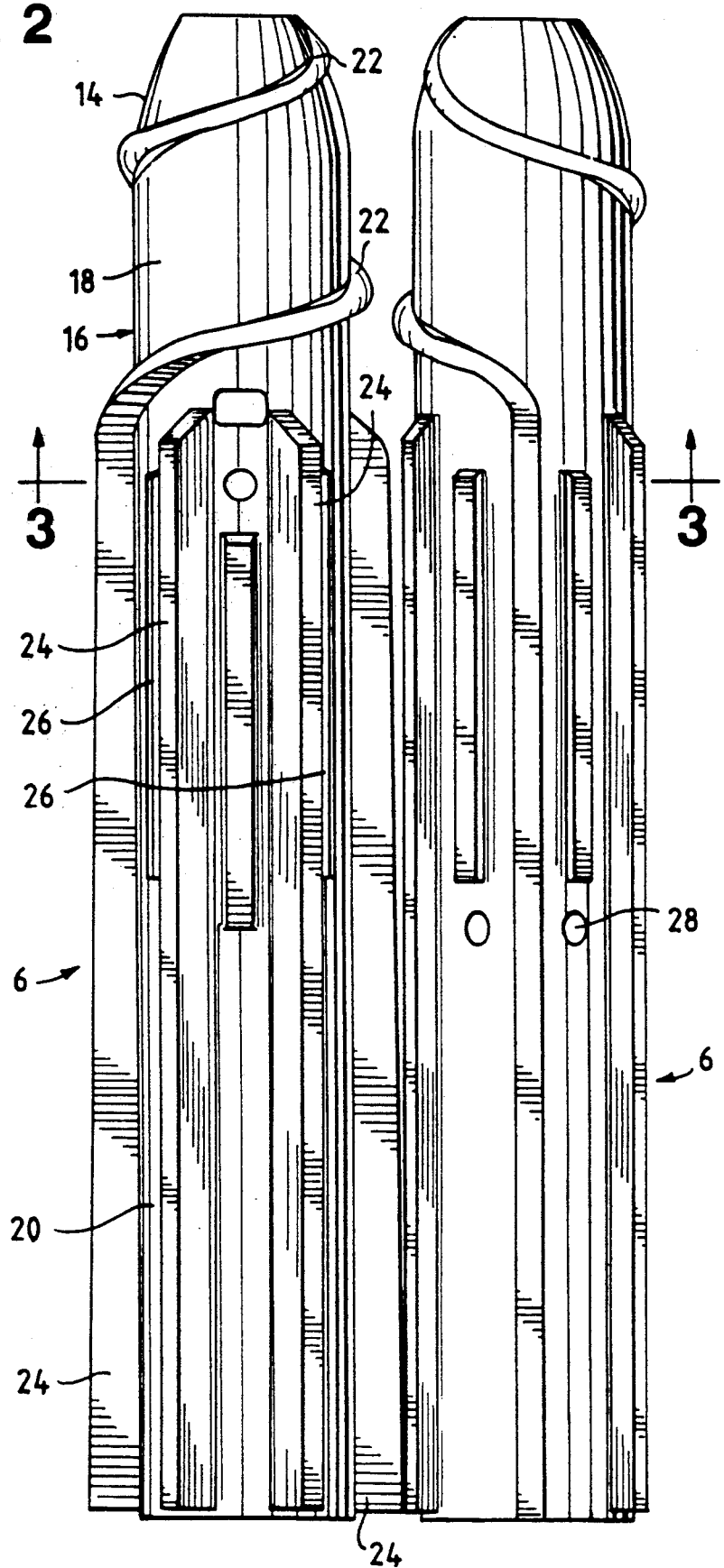
FIG. 2 is a top view of a pair of corn harvester snapping rolls.
Figure 3:
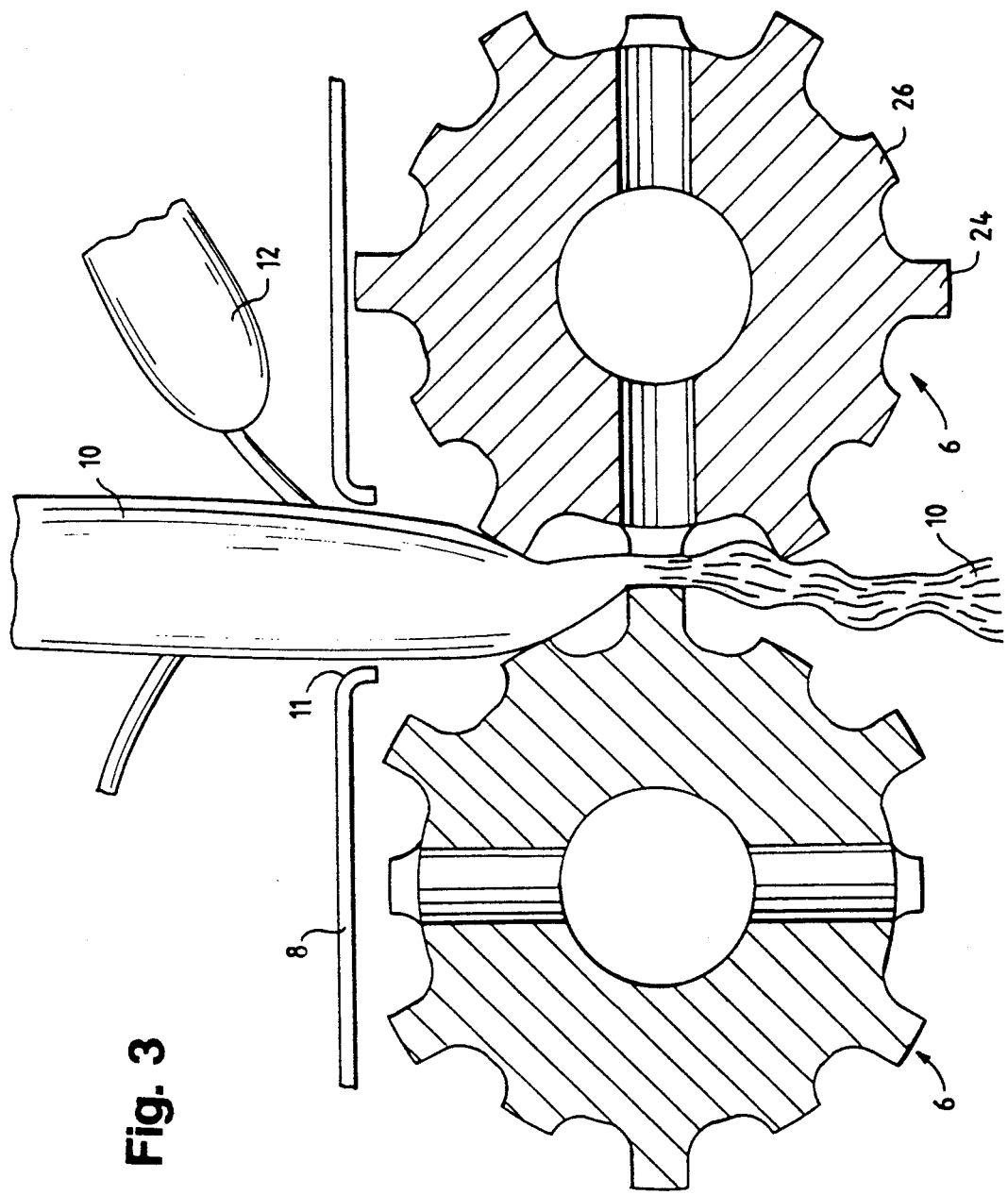
FIG. 3 is an enlarged sectional view taken along line 3—3 of FIG. 2 and showing the stripper plate and aperture.

As previously noted a modern corn harvester 2 traverses a field engaging and harvesting multiple rows of corn at the same time. The forward portions 4 of the harvester engage the stalks of each row and channel them toward the individual corn head assemblies. The details of such structures are varied but conventional and need not be further described.

The number of rows harvested at the same time depends on the size of the harvester. While larger harvesters may have larger and more complex drive units and devices for further processing, only a corn head assembly unit description is necessary to understand the invention. The unit is duplicated for each additional row.

Generally the corn head assembly of the present invention includes two elongated axially parallel snapping rolls 6 which cooperate with a stripper plate 8 to separate corn stalks 10 and corn ears 12. The rolls 6 are positioned with their axes extending downwardly and forwardly parallel to the stripper plate 8. The stripper plate 8 is above the rolls 6 and has a narrow throat or aperture 12 extending fore and aft in the harvester parallel to the roll axes. The aperture is wide enough that stalks and leaves can pass downwardly therethrough but so narrow that corn ears cannot pass therethrough.

As the harvester moves forward the stripper plate 8 exerts forward and upward force upon the ear. At the same time, the snapper rolls 6 exert rearward and downward force on the stalk, thereby snapping off or stripping the ears from the stalks. The ears are transported for further processing such as husking and shelling.

The snapping rolls each have frusto-conical ends 14 and cylindrical bodies 16. The bodies each have a front portion 18 and a rear portion 20. Projecting radially from the conical end 14 and front portion 18 of each roll is a ridge 22 in the form of a helix. The ridge 22 is tapered outwardly from the tip of the conical end 14 reaching its greatest height where the rear end of the front portion 18 becomes the front end of the rear portion 20. The helical ridges on each roll are wrapped in opposite sense. In operation the rolls are also driven in opposite senses. The ridges engage the corn stalks and therefore force the stalks axially along the rolls while exerting a downward force. The necessary direction of movement of the stalks, relative to the harvester which is moving forward is rearwardly toward the rear portions 20 of the snapper rollers. If both the drive directions and winding senses for the helical ridges are reversed from those shown in the drawings the direction in which the stalks are driven is not affected.

The rear portion of the body of each roll is provided with an even number of axially extending, radially projecting primary flutes and an equal number of axially extending, radially projecting secondary flutes 26 alternating with one another and equally spaced around the circumference of the body. In a preferred embodiment there are six of each type of flute on each roller, although other equal numbers of each type of flute could be used. One of the primary flutes is conveniently formed as an extension of the helical ridge 22.

The two rollers 6 of each assembly are registered so that during rotation of the rolls each primary flute 24 of one roller opposes a secondary flute 26 of the other roller. This provides a bending action on the stalk as it is engaged by successive flutes. Further, the separation of the rolls is such that the space between opposing flutes is so small as to crush the stalk therebetween.

Both sets of flutes are tapered from a smaller radial dimension toward the forward end of the rear portion 20 to a larger radial dimension at the rearward end of the rear portion 20. This results in the space between opposing flutes of opposite rollers becoming progressively less as the rearward end of the rear portion is approached. As a result upper portions of the corn stalk which are smaller in cross section than the lower portions are nevertheless engaged by the flutes because they pass through the rearward portions. The space between opposing primary and secondary flutes when they are in opposition is selected to provide such small spacing that the stalks therebetween will be positively gripped and crushed. The crushing and compressing action provides a superior result than the mere bending action on the stalk as shown in the Fischer patent where the flutes of two rollers alternately engage the stalk, because a crushed stalk will decompose more rapidly over the winter months as is desired for no till farming.

Further, the direct opposition of flutes on the two rollers causes a positive grip on the stalk, unlike the alternate engagement in the known prior art. This increases the opposing forces on the ear and stalk and strips the ear more cleanly from the stalk. As a result there is less trash or residue accompanying the ear in further processing.

As shown in the drawings the primary flutes 24 extend the entire length of the rear portion 20 of the rollers 6. The secondary flutes are located near the front end of the rear portion and do not extend the entire length of the rolls. While it would be possible and could be desirable to extend the secondary flutes along the entire length of the rolls, the gripping action is important only on stalk portions below the corn ears. In any event there must be some discontinuities along the lengths of the secondary flutes to provide space for linkage to other mechanisms, such as by the bolt holes 28.

In snapping roller assemblies which have been built and are still undergoing experimental testing during the harvest season of 1992, which has been delayed due to adverse weather conditions, conventional rollers each with six alternating identical flutes have been modified with the addition of six secondary flutes welded in place. Unitary castings of the improved assemblies could also be accomplished.

Preferably both sets of flutes are of an even number to provide symmetry and rotational balance. With appropriate counterweighting odd numbers of flutes could be used.

Various changes and modifications could be made in the described invention without departing from the scope of the following claims.

What is claimed is:

1. A corn head assembly for cooperation with a stripper plate with a slot therethrough for receiving corn stalks, a pair of rotatable rolls with axes parallel to said slot, each of said rolls having an equal plurality of axially extending radially projecting flutes for engaging a corn stalk wherein alternate ones of said flutes are primary flutes and the remainder of said flutes are secondary flutes, wherein said primary flutes project radially by a greater amount than said secondary flutes and wherein said rolls are registered so that in rotation of said rolls each primary flute of one roll opposes a secondary flute of the other roll.

2. A corn head assembly according to claim 1 wherein the space between opposing flutes is less than the diameter of the corn stalk at the engagement location s that the stalk is positively gripped and crushed.

3. A corn head assembly according to claim 1 wherein each of said rolls comprises a front end at least partly conical in shape and said front end includes a helical ridge for engaging a corn stalk.

4. A corn head assembly according to claim 3 wherein said ridge is continuous with one of said primary flutes.

5. A corn head assembly according to claim 1 wherein the radial projections of both said primary flutes and said secondary flutes gradually increases with elevation of said rolls above ground level.

6. A corn head assembly according to claim 1 including on each roll an even number of primary flutes and an even number of secondary flutes.

* * * * *

UNITED STATES PATENT AND TRADEMARK OFFICE
CERTIFICATE OF CORRECTION

PATENT NO. : 5,282,352
DATED : February 1, 1994
INVENTOR(S) : Ronald E. Schoolman It is certified that error appears in the above-indentified patent and that said Letters Patent is hereby corrected as shown below:

On the Title Page, Item [76], column 1, line 3, add --and Brent R. Schoolman, 224 S. Central, Gilman, Ill. 60938-- after "60955".

On the Title Page, Item [57], column 2, line 6, add --corn-- after "counterrotating".

Column 4, line 64, change "s" to --so--.

Signed and Sealed this

Twelfth Day of July, 1994

Attest:

BRUCE LEHMAN

Attesting Officer     Commissioner of Patents and Trademarks